United States Patent [19]

Lien et al.

[11] Patent Number: 5,063,375

[45] Date of Patent: Nov. 5, 1991

[54] METHOD AND APPARATUS FOR SHADING IMAGES

[75] Inventors: Sheue-Ling Lien, Mountain View; Michael J. Shantz; Susan E. Carrie, both of Sunnyvale; Jim V. Loo, Los Altos; David Elrod, Sunnyvale, all of Calif.

[73] Assignee: Sun Microsystems, Inc., Mountain View, Calif.

[21] Appl. No.: 409,262

[22] Filed: Sep. 18, 1989

Related U.S. Application Data

[63] Continuation of Ser. No. 77,797, Jul. 27, 1987, abandoned.

[51] Int. Cl.$^5$ ............................................. G09G 1/28
[52] U.S. Cl. .................................... 340/703; 340/723; 340/728; 340/747; 395/140
[58] Field of Search ............... 340/747, 701, 723, 728, 340/793, 703; 364/521, 518; 358/455, 456, 461

[56] References Cited

U.S. PATENT DOCUMENTS

| | | | |
|---|---|---|---|
| 4,586,037 | 4/1986 | Rosener et al. | 340/724 |
| 4,631,690 | 12/1986 | Corthout et al. | 340/747 |
| 4,648,049 | 3/1987 | Dines et al. | 340/703 |
| 4,736,330 | 4/1988 | Capowski | 340/724 |
| 4,745,575 | 5/1988 | Hawes | 340/747 |
| 4,808,984 | 2/1989 | Trueblood et al. | 340/728 |

OTHER PUBLICATIONS

Gary Bishop; "Fast Phong Shading"; AT&T Bell Laboratories; ACM 0-89791-196-2/86/008/0103; Aug./1986; vol. 20; pp. 103-105.
Fujimoto et al.; "JAG Free Images on a Raster CRT"; Graphics Computer Corporation; pp. 1-15, 1983.
Foley et al.; "Fundamentals of Interactive Computer Graphics"; 1981; Chapter 13, Section 13.5 & 13.6; and Chapter 16, 1982.
Henri Gouraud; "Continous Shading of Curved Surfaces"; IEEE Transactions on Computers, Jun. 1971; pp. 302-308.
Bui Tuong Phong; "Illumination for Computer-Generated Images"; UTEC-CS-73-129; Jul.-1973.
Tom Duff; "Smoothly Shaded Renderings of Polyhedral Objects on Raster Displays"; Computer Graphics Laboratory, 1979 ACM0-89791-004-4/79/0800-270, pp. 270-275.
Steven A. Coons; "Surfaces for Computer-Aided Design of Space Forms"; MIT project MAC; Jun. 1969; Section V.

Primary Examiner—Jeffery A. Brier
Assistant Examiner—M. Fatahiyar
Attorney, Agent, or Firm—Blakely, Sokoloff, Taylor & Zafman

[57] ABSTRACT

The present invention provides unique methods and apparatus for shading curves, polygons and patches, implementing Phong, Gouraud and other shading techniques in the rendering of images on a cathode ray tube or other display device. The present invention also includes a unique method and apparatus for shading patches by rendering a series of adjacent curves such that no pixel gaps exist between each rendered curve.

22 Claims, 5 Drawing Sheets

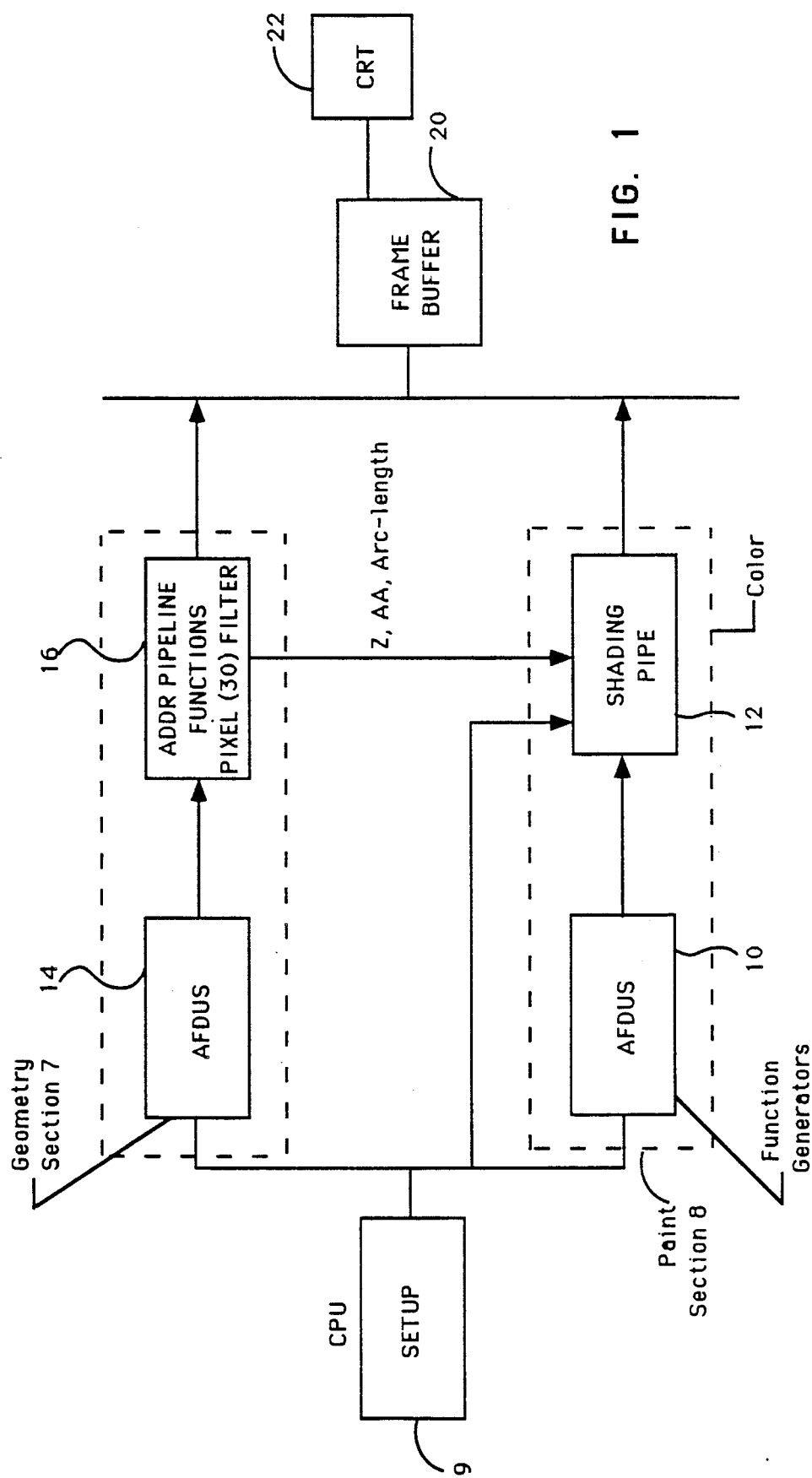

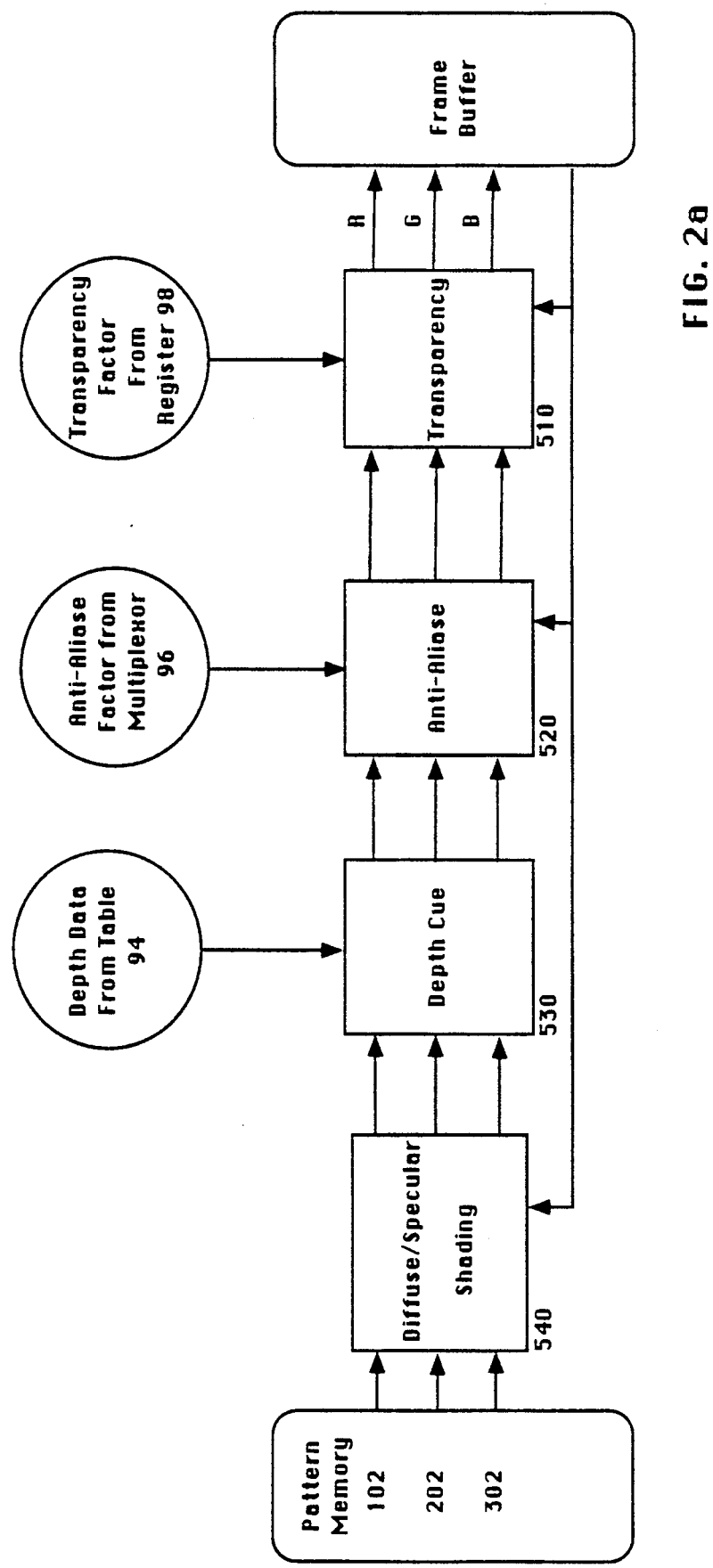

METHOD AND APPARATUS FOR SHADING IMAGES

RELATED APPLICATIONS

This application is a continuation of U.S. Pat. application Ser. No. 077,797, filed July 27, 1987 entitled "method and Apparatus for Shading Images", now abandoned.

FIELD OF THE INVENTION

The present application hereby incorporates by reference co-pending U.S. patent applications; "Method and Apparatus for Adaptive Forward Differencing in the Rendering of Curves and Surfaces," Ser. no. 07/047,696; "Method and Apparatus for Rendering Vectors Using Bresenham Parameters," Ser. no. 07/047,693; and "Method and Apparatus for Deriving Instantaneous Reciprocals of the Homogenous Coordinate w for use in Defining Images on a Display" Ser. No. 07/047,767.

The present invention relates to methods and apparatus for generating images on a cathode ray tube ("CRT") or other display device. More particularly, the present invention relates to methods and apparatus for the painting of curves, curved surfaces, vectors, polygons or objects on a CRT or other display device.

BACKGROUND OF THE INVENTION

In many computer systems, it is quite common to represent and convey information to a user through digitial images. These images may take a variety of forms, such as, for example, alpha numeric characters, cartesian graphs, and other pictorial representations. In many applications, the digital images are conveyed to a user on a display device, such as a raster scan video monitor, printer or the like. Typically, the images to be displayed are stored in digital form, manipulated and then displayed In rendering an image on a cathode ray tube, the coordinates for each pixel of an image being rendered must be calculated, as well as such values as the color, transparency, depth cue, haze and specular and diffuse factors for each such pixel. Rendering a pixel so that it illustrates a characteristic of an object being rendered (i.e. a three-dimensional object) to reflect depth, closeness to the view, reflection from light sources, etc. is known as "shading" the pixel.

Several shading techniques are used for generating smoothly shaded images of surfaces approximated by three dimensional parametric patches or polygons. One such well known technique is Phong shading, which is a desirable shading technique because it gives a fairly realistic rendering of the desired image with a modest computational cost. Most three-dimensional computer-aided design applications give highest priority to interactive performance and therefore often utilize the realism afforded by Phong shading. Another well-known shading technique is called Gouraud shading, which performs linear interpolation of color over the individual polygons being rendered and which is less accurate than Phong shading. Polygon approximations of curved surfaces are used for performance reasons, since most prior art high-speed graphics hardware is built for fast rendering of polygons. A typical bi-cubic patch, for example, may require 100 or more polygons to give a reasonably accurate approximation of the desired patch. Many design applications would be greatly facilitated if smooth, high-speed, curved surface rendering were available.

Accordingly, it is a principal object of the present invention to provide a parametric patch rendering method and apparatus, which uses relatively simple hardware to do Phong shading directly without slowing down the pixel rendering rate.

Another object of the present invention is to provide a method and apparatus for the rendering of images having uniform bivariate surface patches as well as non-uniform rational B-spline surfaces.

Accordingly, in the present invention, bi-cubic functions which approximate the shading parameters are derived and evaluated, by adaptive forward differencing circuits (AFDU) to provide a shaded color at each pixel along a parametric curve. [Note: adaptive forward differencing circuits (AFDU) will later be explained.]- The present invention provides an apparatus for accurately and quickly shading vectors and polygons at a much faster rate, and without any appreciable loss in quality, than was heretofore available under prior art methods. [For a more thorough understanding of Phong shading and shading of polygons, vectors, curves and other objects, see: Bui Tuong-Phong, *Illumination For Computer-Generated Images*, UTEC-CS c-73-129, July 1973; Tom Duff, "Smoothly Shaded Renderings Of Polyhedral Objects On Raster Displays," *Computer Graphics*, Volume 13, No. 2, Aug. 1979; Steven A. Coon, "Surfaces For Computer-Aided Design Of Space Forms," *Project MAC*, Massachusetts Institute of Technology, MAC-TR-41, June, 1967; Bishop and Weimer, "Fast Phong Shading," *Computer Graphics*, Volume 20, No. 4, Aug. 1986; M. Shantz and S-L Lien, "Shading Bicubic Patches," *Computer Graphics*, Volume 21, No. 4, July, 1987; Sheue-Ling Lien, Michael Shantz and Vaughan Pratt, "Adaptive Forward Differencing For Rendering Curves And Surfaces," *Computer Graphics*, Volume 21, July, 1987.]

BRIEF SUMMARY OF THE INVENTION

The aforementioned objects are accomplished in a method and apparatus for shading vectors and curves on a display device. The apparatus comprises a means for implementing a first function, said first function comprising:

$$T_c [PB_1] + (1 - T_c) X:$$

where $T_c$ equals a transparency factor; $PB_1$ equals a first pixel buffer of data fed back from a frame buffer from each pixel address along an object such as a curve, and where X represents a second function; the apparatus for shading vectors and curves also comprising a means for implementing the second function, the second function comprising:

$$B_e[PB_2] + (1 - B_e) Y:$$

where $B_e$ = a modified Bresenham error factor which is calculated by the apparatus of the present invention; where $PB_2$ = a second pixel buffer of data fed back from the frame buffer and where Y represents a third function. The above described apparatus also comprises a means for implementing a third function, the third function comprising:

$$Z[C_d] + (1 - Z) [PM]:$$

where Z represents a depth volume or distance of the object from the viewer; Cd represents a "haze" or background color, and wherein PM represents intrinsic curve color from a pattern memory. Finally, the apparatus for shading vectors and curves includes a means for combining the above implementations of the first, second and third functions together, to comprise implementation of $$Tc[PB_1]+(1-Tc)[Be[PB_2]+(1-Be)[Z(Cd)+1-Z(PM)]]$$

thereby shading the curve and vector being rendered.

The present invention also includes a means for shading polygons comprising a means for implementing a first function, the first function comprising:

$$Tc[B+(1-Tc)X;$$

where Tc=a transparency factor; PB=pixel buffer of data fed back from the frame buffer, and where X represents a second function. The apparatus for shading polygons also includes a means for implementing the second function, the second function comprising:

$$Z[Cd]+(1-Z)[\text{diffuse}[IM]+\text{specular}[Lc]];$$

where Cd represents depth cue color or haze color, z represents depth, IM is the image color )pattern memory), LC is the light color, and where "diffuse" and "specular" represent third and fourth functions.

The present invention also includes a means for implementing the above mentioned third (diffuse) function, the third function comprising:

$$Ka + 1/\sqrt{N \cdot N}\ [aNL_{rt} + (1-a)NL_{lt}];$$

where N represents the surface normal vector; N·N is the dot product of N with itself, $NL_{rt}$ is the dot product of the surface normal at the right edge of the polygon and a unit vector L toward a light source; $NL_{lt}$ is the dot product of N and L at the left edge of the polygon; Ka represents the coefficient of ambient reflection. Alpha (α) increases from 0 to 1 between the left and right edge of the polygon.

The apparatus for shading polygons also includes a means for implementing the above mentioned fourth (specular) function; the fourth function comprising:

$$\left(\frac{1}{\sqrt{N \cdot N}}[aNH_{rt} + (1-a)NH_{lt}]\right)^{Oe}$$

where $NH_{rt}$ is the dot product of the surface normal N at the right edge of the polygon times the unit vector H in the direction of maximum highlight, $NH_{lt}$ is the dot product of the normal vector N at the left edge of the polygon times H, Oe is a power to which the expression in brackets is raised, and where α increases from 0 to 1 between the left and right edges of the polygon.

Finally, the invented apparatus for shading polygons includes a means for combining said implemented first, second, third and fourth functions to thereby comprise:

$$Tc[PB]+(1-Tc)[z[Cd]+(1-z)[\text{diffuse}[IM]+\text{specular}[Lc]]];$$

where IM is the object color from a constant color value or a color value from an addressed image array of color values and where Lc is the color of the light source.

The present invention also includes a means for shading parametric patches by shading a sequence of surface curves spaced closely together. The spacing calculation is described below, comprising a means for implementing the first function, the first function comprising:

$$Tc[PB]+(1-Tc)X;$$

The apparatus for shading patches also includes a means for implementing the second function X, the second function $$Z[Cd]+(1-Z)Y;$$

where Cd=depth cue color, z=depth and indicates that "diffuse" and, "specular" represent fifth and sixth functions.

The apparatus also includes a means for implementing a fifth (diffuse) and sixth (specular) function. The fifth function comprising:

$$Ka + N \cdot L/\sqrt{N \cdot N}$$

where N is the surface normal vector which varies along a surface curve as a parametric function. The sixth function (specular) comprising:

$$(N \cdot H/\sqrt{N \cdot N})^{Oe}$$

Finally the apparatus for shading parametric patches includes a means for combining said implemented first, second, fifth and sixth functions to thereby comprise:

$$Tc[PB] +$$
$$(1 - Tc)\ [Z[Cd] + (1-Z)\ [(Ka + N \cdot L/\sqrt{N \cdot N})[IM] +$$
$$(N \cdot H/\sqrt{N \cdot N})^{Oe} [Lc]]]$$

thereby shading the surface curve of the parametric patch being rendered.

BRIEF DESCRIPTION OF THE DRAWINGS

FIG. 1 is a block diagram of the circuitry for shading pixels of the present invention that incorporates the present invention;

FIGS. 2a and 2b are an exploded view of the block diagram of FIG. 1;

DETAILED DESCRIPTION OF THE INVENTION

Figure 2B:
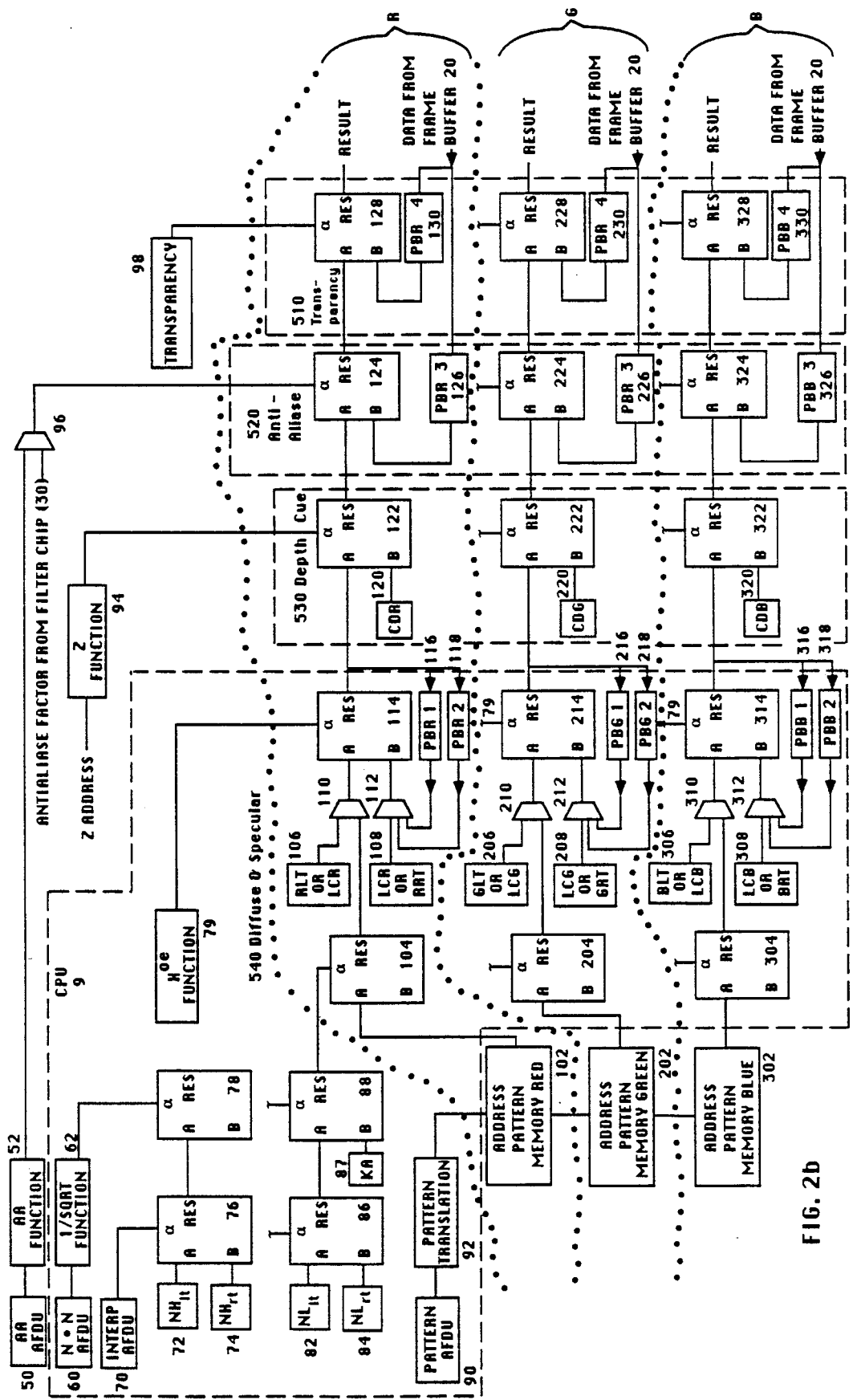

The present invention discloses apparatus and methods having particular application for use in a computer system used for the graphic display of images. Although the present invention is described with reference to specific circuits, block diagrams, signals, algorithms, etc., it will be appreciated by one of ordinary skill in the art that such details are disclosed simply to provide a more thorough understanding of the present invention. It will therefore be apparent to one skilled in the art that the present invention may be practiced without these specific details. In other instances, well known circuits are shown in block diagram form in order not to obscure the present invention unnecessarily.

In FIG. 1 there is shown an overall functional block diagram of the present invention. In order to define images on a CRT display or other display device, it is necessary to manipulate data at a high speed in order to select the pixel location and color on a CRT display that define the curve, curved surface, vector or image that is desired to be displayed. It is well known in the art that the location of each point to be displayed on a CRT often is represented by digital values stored in a memory device which correspond to x, y, z and w homogeneous coordinates.

Geometry section 7, which includes the X, Y, Z and W AFDU units 14 shown and described in FIG. 1 of co-pending applications, Ser. nos. 07/047,696 and 07/047,693, computes the x, y, w and z homogeneous coordinates of an object whose image is to be displayed. The geometry section 7 also comprises an address pipeline 16 which includes the pixel filter circuit 30 of FIGS. 1 and 7 of co-pending applications Ser. nos. 07/047,696 and 07/047,693, which outputs a modified Bresenham algorithm error term, which is used as an anti-aliasing weighting function. [The afore-mentioned modified version of the Bresenham algorithm is widely used for incrementally stepping along the edge of a polygon in scanline order and in anti-aliasing vector techniques (see Akira Fujimoto and Ko Iwata, "Jag Free Images on a Raster CRT," *Computer Graphics Theory and Applications,* edited by Tosiyasu Kunii, published by Springer Verlag, 1983).]The weighting function is outputted to a shading pipeline 12 of a paint section 150. The paint section 150 is used to color pixels on a CRT 22 as will later be described. The AFDU's 14 output instantaneous x, y, w and z coordinates to address pipeline 16. The pixel filter 30 outputs arc-length and an anti-aliasing weighting function Ce, and also outputs the z coordinate, arc-length and the anti-aliasing weighting function to an address pipeline 12 of paint section 150, as will later be discussed.

Address pipeline 16 outputs the x, y, w and z coordinates to frame buffer 20 to define a particular pixel on a CRT. The instantaneous coordinate z, which is inputted to the shading pipeline 12, is used therein for depth cueing which is a well known technique for fading out objects being rendered so that they appear farther away [in the z (depth) dimension]from the viewer of the image. [Foley & Van Damm, *Interactive Computer Graphics,* Addison Wesley, 1982.]The arc-length outputted to shading pipeline 12 is used for incrementally indexing a pattern memory for the purpose of mapping a pattern along a curve, while the anti-aliasing weighting factor is used for blending pixels along the edge or silhouette of an object being rendered with the background to reduce the jagged appearance of images on a raster display.

Paint section 150 comprises a plurality of additional AFDU circuits 10 and the above mentioned shading pipeline 12. Paint section 150 renders and outputs red, green and blue representations of the color to be displayed at each pixel an performs vector shading, curve shading, polygon shading, as well as patch shading (i.e. shading of bi-cubic patches). The operation and performance of each of these functions will be explained in greater detail hereinafter.

AFDU circuits 10 serve as function generators to provide parametric inputs to the shading pipeline 12. More specifically, AFDU's 10 serve the purpose of computing parametric cubic approximations to the normal vector dot products in the well known Phong shading equation, as well as computing linear interpolation functions and addresses into image memory for mapping images onto patches. Shading pipeline 12 comprises three channels, one each for red, green and blue processing. Each channel comprises a series of cascaded arithmetic units that perform color vector arithmetic operations. Each arithmetic unit in shading pipeline 12 performs on of several arithmetic functions, which will later be described, depending upon the command received from CPU 9.

Shading pipeline 12 computes and outputs to frame buffer 20 colors which have both diffuse and specular reflection contributions and, in addition, adds color depth cueing, anti-aliasing, optional motion blur and transparency to each pixel color. Pixel color values are outputted from shading pipeline 12 to frame buffer 20 for display on the CRT 22 (i.e. as defined by x, y, z and w coordinates).

Shading pipeline 12 may also have its output directed to pixel buffers in shading pipeline 12 so that a recursive computational ability is provided. The values computed at each pixel address are written sequentially into a pixel buffer memory. As will later be explained, the same curve may be executed again by AFDU's 14 and 10 and combined with the previously computed pixel values stored in the pixel buffer for additional shading computations.

Address pipeline 16 may also function in a frame buffer read mode whereby the addresses generated by address pipeline 16 are used to read pixel values from the frame buffer 20 and output these values to sequential locations in the shading pipeline 12 so that these values may be used in subsequent rendering operations such as for anti-aliasing, transparency and motion blur calculations.

VECTOR SHADING

With respect to rendering vectors, vector attributes include line width, anti-aliasing, color, texture, depth cueing and transparency. Line width and anti-aliasing are derived from the geometry section 7 as described above and as will later be more fully explained. Color, texture depth cueing and transparency are derived by implementing the below listed co-efficients as calculated in formula (1) below.

$T_c$ = Transparency coefficient ranges 0 (opaque) to 1(clear), and typically comprises 12 fractional bits. $T_c$ is constant for a given object.

PB = pixel buffer memory, addressed by values generated by the AFDU's 10. <R,G,B>, range 0 to 255, comprises 12 fractional bits (typical).

$B_e$ = modified Bresenham error (used as anti-aliasing weighting function) range from 0 to 1, and typically comprises 12 fractional bits. B is generated by the AFDU's 14 for each pixel along the vector.

IM = Image memory, IM

Z = Depth value from ZAFD, range 0 to 1, typically 12 fractional bits $C_d$ = Color constant for depth cueing background, <R,G,B>, 8 bits $$\begin{bmatrix} \text{Red} \\ \text{Green} \\ \text{Blue} \end{bmatrix} = Tc \begin{bmatrix} PB_r \\ PB_g \\ PB_b \end{bmatrix} + (1 - Tc) \left( Be \begin{bmatrix} PB_r \\ PB_g \\ PB_b \end{bmatrix} + \right.$$

$$\left. (1 - Be) \left( Z \begin{bmatrix} Cd_r \\ Cd_g \\ Cd_b \end{bmatrix} + (1 - Z) \begin{bmatrix} IM_r \\ IM_g \\ IM_b \end{bmatrix} \right) \right) \quad (1)$$

The above equation can be simplified by setting $Tc = 0$ for anti-aliasing opaque objects, by substituting a constant color Ca for PB in the anti-aliasing term, by setting $Be = 0$ for no anti-aliasing, by substituting constant color Oc for IM, or by setting $Z = 0$ when no depth cueing is desired. (Note: With respect to an anti-aliased vector, it will be appreciated that its two sides can be drawn independently as two separate vectors side by side.) Implementation of equation (1) will later be described with reference to the circuitry of FIGS. 2a and 2b.

CURVE SHADING

Curves are very similar to vectors in their shading attributes. (Reference Foley and Van Damm, *Fundamentals of Interactive Computer Graphics*, Addison Wesley, 1982.) The primary difference being that an anti-aliasing coefficient Ce replaces Be of equation (1), above. Accordingly, the equation for rendering a curve is accomplished by implementing equation 2 below.

$$\begin{bmatrix} R \\ G \\ B \end{bmatrix} = Tc \begin{bmatrix} PB_r \\ PB_g \\ PB_b \end{bmatrix} + (1 - Tc) \left( Ce \begin{bmatrix} PB_r \\ PB_g \\ PB_b \end{bmatrix} + \right.$$

$$\left. (1 - Ce) \left( Z \begin{bmatrix} Cd_r \\ Cd_g \\ Cd_b \end{bmatrix} + (1 - Z) \begin{bmatrix} IM_r \\ IM_g \\ IM_b \end{bmatrix} \right) \right) \quad (2)$$

Equation (2) offers the same simplifications as for vectors. The coefficient Ce is computed by the pixel filter 30 in address pipeline 16 for each pixel along the curve. This circuit is part of pixel filter 30 and will later be described in greater

POLYGON SHADING

The shading attributes which apply to polygons include hollow, solid, Gouraud, or Phong shading style, image mapping, anti-aliasing, depth cueing, and transparency. The following equation gives the shading equation for a line between two points (i.e. a scanline) of a polygon. Polygon shading is accomplished by implementing the coefficients listed below in equation (3) and (4) below.

NL = Unnormalized dot product N·L at the left or right edge of a scan line of a polygon being shaded, the normals at the vertices being normalized, such that linear interpolation causes NL to always range from 0 to 1, never exceeding 1. NL in the preferred embodiment has 12 fractional bits, although more or less bits may be used.

NH = Unnormalized dot product N·H at the left or right edge of the scan line of the polygon (typically having the same range and bits as NL).

NN = The squared length of the surface normal vector, i.e. the dot product of N and N. This value typically, in the preferred embodiment, is from 0.5 to 1 and requires 12 fractional bits.

$\alpha$ = a value generated by an AFDU circuit which increases linearly from 0 to 1 between the left and right edges of a scan line of a polygon being shaded and typically includes 12 fractional bits. (Note: the AFDU circuit is identical in circuitry to the X AFDU circuit of FIG. 3 of co-pending applications, Ser. nos. 07/047,696 and 07/047,693.)

$$\begin{bmatrix} \text{diff} \\ \text{(diffuse value)} \\ \text{spec} \\ \text{(specular value)} \\ 0 \end{bmatrix} = \begin{bmatrix} Ka \\ 0 \\ 0 \end{bmatrix} + \quad (3)$$

$$\left( \frac{1}{\sqrt{N \cdot N}} \right) \left( \alpha \begin{bmatrix} NL_{rt} \\ NH_{rt} \\ 0 \end{bmatrix} + (1 - \alpha) \begin{bmatrix} NL_{lt} \\ NH_{lt} \\ 0 \end{bmatrix} \right)$$

$$\begin{bmatrix} R \\ G \\ B \end{bmatrix} = Tc \begin{bmatrix} PB_r \\ PB_g \\ PB_b \end{bmatrix} + (1 - Tc) \left( Z \begin{bmatrix} Cd_r \\ Cd_g \\ Cd_b \end{bmatrix} + \right. \quad (4)$$

$$\left. (1 - Z) \left( \text{spec}^\alpha \begin{bmatrix} Lc_r \\ Lc_g \\ Lc_b \end{bmatrix} + \text{diff} \begin{bmatrix} IM_r \\ IM_g \\ IM_b \end{bmatrix} \right) \right)$$

The above equations (3) and (4) can be greatly simplified by the high overhead technique of using the W AFDU to generate an approximation of spec and a AFDU circuit (later described with reference to FIGS. 2a and 2b) to approximate diff. Spec and diff range from 0 to 1 and together with Ka must sum to 1 and each typically, in the preferred embodiment, is comprised of 12 fractional bits.

For Gouraud shading (i.e. interpolation of color along a scanline of a CRT) the above shade equation may be simplified by eliminating the multiply by $1/\sqrt{N \cdot N}$ .

(Note: Gouraud shading is well known in the art and is explained, for example, in Gouraud, Henri, *Computer Display of Curved Surfaces*, Department 1971, see also Tom Duff, "Smoothly Shaded Renderings of Polyhedral Objects on Raster Displays," *Computer Graphics*, Volume 13, 1979.)

As is well known in the art, in shading polygons, boundaries must often be drawn around polygons to render the edge-style attribute. Where such boundaries are more than one pixel wide, a problem arises in getting correct values for dz/dx on the boundary being rendered, so that the value doesn't minimize the x value boundary pixels. Applicant has discovered a solution to the afore-mentioned problem of rendering boundaries which are more than one pixel wide. Two polygons are rendered, an edge polygon defining an outer boundary, and an inner polygon defining an inner hole. The vertices of the inner polygon are also those of the polygon interior, thereby eliminating the problem of occluded boundary pixels. Alternatively, if the boundary is only one pixel wide or if anti-aliasing is desired at the edge of the polygon being rendered, it is preferred to render a vector (half an anti-aliased vector) wrapping the polygon. The x or y offset of the anti-aliased vector method insures that the wrapping vector contains no pixels which lie inside the exact boundary of the polygon. The shading equation for an anti-aliased edge around a Phong shaded polygon is $$\begin{bmatrix} \text{diff} \\ \text{spec} \\ 0 \end{bmatrix} = \begin{bmatrix} Ka \\ 0 \\ 0 \end{bmatrix} + \left(\frac{1}{\sqrt{N \cdot N}}\right) \left( \alpha \begin{bmatrix} NL_{pl} \\ NH_{pl} \\ 0 \end{bmatrix} + (1 - \alpha) \begin{bmatrix} NL_{po} \\ NH_{po} \\ 0 \end{bmatrix} \right)$$

$$\begin{bmatrix} R \\ G \\ B \end{bmatrix} = Tc \begin{bmatrix} PB_r \\ PB_g \\ PB_b \end{bmatrix} + (1 - Tc) \left( Be \begin{bmatrix} PB_r \\ PB_g \\ PB_b \end{bmatrix} + (1 - Be) \left( Z \begin{bmatrix} Cd_r \\ Cd_g \\ Cd_b \end{bmatrix} + (1 - Z) \left( \text{spec}^{oe} \begin{bmatrix} Lc_r \\ Lc_g \\ Lc_b \end{bmatrix} + \text{diff} \begin{bmatrix} IM_r \\ IM_g \\ IM_b \end{bmatrix} \right) \right) \right)$$

It has been discovered that multiple light sources may be rendered by the apparatus of FIG. 2 by first storing diff [IM] in the pixel buffers 116, 216 and 316 of FIG. 2b and then repeatedly adding the specular component $\text{spec}^{oe}[Lc]$ for each light source to the pixel buffer.

PARAMETRIC PATCH SHADING

The following equation gives the shading equation for a surface curve across a bivariate parametric patch.

$$\begin{bmatrix} R \\ G \\ B \end{bmatrix} = Tc \begin{bmatrix} PB_r \\ PB_g \\ PB_b \end{bmatrix} + (1 - Tc) \left( z \begin{bmatrix} Cd_r \\ Cd_g \\ Cd_b \end{bmatrix} + (1 - z) \left( \text{spec}^{Oe} \begin{bmatrix} Lc_r \\ Lc_g \\ Lc_b \end{bmatrix} + \text{diff} \begin{bmatrix} IM_r \\ IM_g \\ IM_b \end{bmatrix} \right) \right)$$

As described in co-pending applications, Ser. nos. 07/047,696 and 07/047,693, AFDU circuits may be used to implement a cubic (or higher order) parametric function of the variable (called the parameter) v. These AFDU circuits used as cubic function generators are used to generate x(v), y(v), z(v), and w(v) to give the pixel addresses along a cubic curve such that substantially one pixel steps are generated. AFDU circuits may also be used to generate cubic function approximations to spec(v), diff(v), N·L(v), N·H(v) or N·N(v) which are all controlled by the pixel filter 30 to generate shading values for the corresponding pixel addresses.

For the shading of a bivariate surface patch f(u,v), the apparatus of FIGS. 2a and 2b generates a sequence of curves g(v) spaced closely enough together in the direction of the u parameter so that the resulting surface contains no holes or pixel gaps. Thus the patch is rendered in u,v parameter space, thereby greatly facilitating such shading operations as image mapping and patch trimming which are well known in the art. Generating a sequence of closely spaced curves to shade a bivariate patch can be implemented using the aforedescribed adaptive forwar differencing technique of co-pending applications, Ser. nos. 07/047,696 and 07/047,693.

The following description will convey to one skilled in the art the method of the present invention for shading patches by rendering several closely spaced curves.

In adaptive forward differencing from a first curve to the next curve, the basis function for the first curve is f(u,v) while the basis function for the second curve is f(u+du,v). The well known matrix in forward difference basis for representing a curve in u,v is:

$$f(u,v) = Bu \begin{bmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{bmatrix} Bv$$

where Bu and Bv are the forward difference basis matrices. [For a more thorough explanation of forward difference basis matrices, see Foley & Van Damm, *Interactive Computer Graphics*, Addison Wesley, 1982.]

The the column of the A matrix is referred to by Ax. Similarly, the ith row of the A matrix is referred to by Aix. A forward difference step from one curve to the next curve on a bivariate parametric patch is achieved by adding column $A_{xl}$ to $A_{x0}$, $A_{x2}$ to $A_{x1}$ and $A_{x3}$ to $A_{x2}$. The next curve is then defined by the four values in column $A_{x0}$. The next curve rendered is checked to see if it will be too far (leaving pixel gaps) away from the current curve as follows.

The second column $A_{x1}$ indicates the distance between the current curve and the next curve, which is converted to the well known "Bezier" basis. The well known Bezier convex hull is then tested to get the maximum distance in pixel coordinate x and y between the two curves. If this distance is greater than a predetermined threshold value, the distance between two curves is adjusted down by each row of the A matrix. If the distance in x and that in y are less than a predetermined minimum threshold, we adjust up the spacing between curves by adjust each row of the matrix. (For a more thorough explanation of "Bezier" basis and its interplay with forward differencing, see Foley & Van Damm, *Fundamentals of Interactive Computer Graphics*, Addison Wesley, 1982.)

Implementation of the above-listed equations for vector, curve, polygon and bi-cubic patch shading will now be described with reference to FIGS. 2a and 2b.

Referring to FIG. 2b, an overall block diagram of the shading hardware of the present invention is shown. FIG. 2b illustrates a three-channel processor for developing standard red, green, and blue signals for a color CRT. In general, with respect to components having reference numerals, 100-199 correspond to the red channel, 200-299 to the green channel, and 300-399 to the blue channel.

FIG. 2a is a simplified block diagram of the block diagram illustrated in FIG. 2b. Referring to FIG. 2a, the system of the present invention comprises Diffuse and Specular Shading Function Block 540, Depth Cue Function Block 530, Anti-aliase Function block 520 and Transparency Function Block 510. These function blocks are organized in a pipeline structure such that the pixel data representative of a graphic object, such as vector curve, polygon or patch is processed serially through the function blocks.

Although the method and apparatus of the present invention is not limited to a particular configuration, is is preferred that the function blocks are organized in the manner illustrated in FIGS. 2a and 2i b. The CPU 9 (FIG. 1) modifies the parameters input to the function blocks such that the functions are customized for the input graphic object. For example, if the graphic object is a vector, the pixel data representative of a portion of a vector is input into Diffuse and Specular Shading Function Block 540 which is controlled to pass the data without modifying it and to input to Depth Cue Function block 530 which modifies the pixel data to provide a depth cueing effect and outputs it to Anti-Aliase Function block 520 which modifies the pixel data to provide an anti-aliase visual effect and outputs the pixel data to Transparency Function Block 510 which performs the transparency calculation to modify the data for a transparency visual effect. For a patch, however, the Diffuse and Specular Shading Function Block 540 is controlled to generate the diffuse and specular shading values which are combined with the pixel data from Pattern memory. Continuing through the pipeline, the Depth Cue Function Block 530 is controlled by the CPU to modify the pixel data to provide a depth cue effect, the Anti-Aliase Function Bock 520 is controlled to pass the data unmodified to the Transparency Function bock 510 which modifies the data to provide a transparency effect the modified pixel data output from Transparency Function Bock 510 is input to the frame buffer.

The combined functionality of the four blocks comprises the shading function which may be used for any graphic object according to the parameters input to the function flocks.

The Specular and Diffuse Shading Function Block 540 perform specular and diffuse shading with respect to polygons and parametric patches. The Specular and Diffuse Shading Function Block 540 comprises registers 72 and 74 which store the specular shading coefficients of the right and left hand side of a scan line ($NH_{rt}$, $NH_{lt}$,) registers 82 and 84 which store the diffused shading coefficients of the right and left sides of the scan line ($NL_{rt}$, $NL_{lt}$). AFDU 60 generates the square length of a surface normal to the vector $N \cdot N$, and $NH_{rt}$ and $NH_{lt}$, subsequently described, represent the unnormalized dot product $N \cdot H$ at the right and left edge of a can line of a polygon being shaded where N is the surface normal vector for the graphic object and H is the unit vector in the direction of maximum highlight. Similarly, $NL_{rt}$ and $NL_{lt}$ represent the unnormalized dot product $N \cdot H$ at the right and left edge of a scanline of a polygon being shaded where N is the surface normal vector for the graphics object and L is the unit vector toward the light source. A second AFDU 70 generates a value, referred to as the interpolation coefficient, which linearly increases from zero to one. AU 76 linearly interpolates $NH_{lt}$, $NH_{rt}$ from registers 72 and 74 and performs the calculation:

$$\alpha NH_{rt} + (1-\alpha)NH_{lt}$$

where $\alpha$ is the output interpolation coefficient from AFDU 70. Another AU 86 linearly interpolates the values $NL_{lt}$, $NL_{rt}$ output from registers 82 and 84 which results in the calculation:

$$\alpha NL_{rt} + (1-\alpha)NL_{lt}$$

where $\alpha$ is the interpolation coefficient output from AFDU 70. The output of AU 86 is input to AU 88 which performs the function $\alpha A + B$ where $\alpha$ is the output from AU 86, A is equal $$\frac{1}{\sqrt{N \cdot N}},$$

output from look up table 62, and B is Ka, the coefficient of ambient reflection stored in register 87. This results in the function:

$$\left( \frac{\alpha NL_{rt} + (1-\alpha)NL_{lt}}{\sqrt{N \cdot N}} \right) + Ka.$$

AU 78 receives input from AU 76 and performs the function $\alpha A$ where $\alpha$ is the output of AU 76 and A is the output from lookup table 62 which is equal to $$\frac{1}{\sqrt{N \cdot N}}.$$

This results in the function:

$$\left( \frac{\alpha NH_{rt} + (1-\alpha)NH_{lt}}{\sqrt{N \cdot N}} \right).$$

The output of AU 78 is input to lookup table 79 which contains a specular power value (Oe) and raises the output form AU 78 to a power equal to the specular power value to produce the result $$\left( \frac{\alpha NH_{rt} + (1-\alpha)NH_{lt}}{\sqrt{N \cdot N}} \right)^{Oe}$$

where Oe is the power of the specular shading and $\alpha$ is the interpolation coefficient output from AFDU 70.

The graphic object pixel data output from the Specular and Diffuse Shading Function Block is modified such that the specular shading values of both ends of a scan line are linearly interpolated by AU 76, normalized by AU 78 and raised to the specular power value by the output from lookup table 70 to provide specular shading and the diffuse shading values of the scan line are linearly interpolated by AU 86 normalized by AU 88 and added to the coefficient of ambient reflection to produce the diffused value.

The diffused and specular values calculated for the graphic object are then combined to produce the result:

Diffuse*PM+Specular*LC where PM represents the pixel data from pattern memory, LC represents the color of the light source (from registers 108, 208, 308), Diffuse (the diffuse coefficient) equals $$\left( \frac{\alpha NL_{rt} + (1-\alpha)NL_{lt}}{\sqrt{N \cdot N}} \right) + Ka$$

and Specular (the specular coefficient raised to the specular exponent) equals $$\left( \frac{\alpha NH_{rt} + (1-\alpha)NH_{lt}}{\sqrt{N \cdot N}} \right)^{Oe}$$

AUs 104, 204 and 304 receive the graphic object pixel data from pattern memory (PM) 102, 202 and 302 and the output from AU 88 (which is the diffuse shading data discussed above) and perform a multiplication function to generate the result:

$$\left( \frac{\alpha NL_{rt} + (1-\alpha)NL_{lt}}{\sqrt{N \cdot N}} + Ka \right) PM$$

The output of AUs 104, 204 and 304 are input to AUs 114 214, 314 along with the specular value and Light Color (LC) and generate the result $\alpha B + A$ where $\alpha$ equals the specular value, B equals the Light Color and A is the output genreated by AUs 104, 204 and 304 comprising the diffuse data to generate the result:

$$\left[ \left( \frac{\alpha NH_{rt} + (1-\alpha)NH_{lt}}{\sqrt{N \cdot N}} \right)^{Oe} \right] LC +$$

$$\left( \frac{\alpha NL_{rt} + (1-\alpha)NL_{lt}}{\sqrt{N \cdot N}} + Ka \right) PM$$

The Depth Cue Function block 530, contains three arithmetic units 122, 222 and 322 and three registers 120, 220 and 320 (see FIG. 2b). The three AUs perform the following calculation:

$\alpha B+(1-\alpha)A$ where $\alpha$ equals the output from lookup table 94 which contains the depth cue weighting factor for the graphic object, B respectively equals the outputs of registers 120, 220 and 320 which store the RGB components of the "haze" or background color and A is the output from AUs 114, 214 and 314 containing the graphic object pixel data output from Specular and Diffuse Shading Function block 540. The result of the depth cue function is that the RGB components of the haze color stored in registers 122, 220 and 320 are receptively blended with the RGB colors output from AUs 114, 214 and 314 by a depth cue weighting factor supplied by table 94 to produce a graphic object having a depth cue visual effect.

The Anti-Aliasing Function Block 520 comprises three arithmetic units 124, 224 and 324 and three pixel buffers 126, 226 and 326 (see FIG. 2b) which store the RGHB components of the pixel data read back from the frame buffer. The three AUs 124, 224 and 324 receive input from multiplexer 96, receptively from AUs 122, 222 and 322 and pixel buffers 126, 226 and 326 and perform the following function $\alpha B+(1-\alpha)A$ where $\alpha$ is the anti-aliase weighting factor from multiplexer 96, which selects input from lookup table 52 (FIG. 2b) when the graphic object is a parametric curve (curve anti-aliase weighting factor CE) and from filter chip 30 when the graphic object is a vector (modified Bresenham error Be), A is the output of AUs 122, 222 and 322, containing the graphic object pixel data output from Depth Cue Function Block 530, and B is the output from pixel buffers 126, 226 and 326. The result of the anti-aliasing function is that the RGB color outputs from AUs 122, 222 and 322 are respectively blended width RGB components stored in the pixel buffers 126, 226 and 326 by the anti-aliasing weighting factor from table 52 or from filter chip 30 to produce a visual anti-aliased effect.

More specifically, the Transparency Function Block 5410 comprises three arithmetic units (AUs) identified as 128, 228 and 328, three pixel buffers (PB) 130, 230, 330 (see FIG. 2b), for storing separately the read, green and blue components of the pixel data read back from the fame buffered. The arithmetic units 128, 228, 328 receive graphic object pixel data form the Anti-Aliase Function Block, pixel data from the frame buffer and alpha input from register 98 which contains the transparency coefficient for that particular orphic object. The Transparency Function Block then performs the calculation $\alpha B+(1-\alpha)A$ where $\alpha$ equals the transparency coefficient, A equals the output of AUs 124, 224 and 324 (FIG. 2b) which contains the pixel data for the graphic object and B equals the output from pixel buffers 130, 230 and 330 which reflect the pixel data currently in the frame buffer. The result of the Transparency Function Block is that the RGB color outputs from AUs 124, 224 and 324 are blended with the RGB components stored in the pixel buffer 130, 3230 and 330 (from the frame buffer) by a transparency coefficient in register 98 to modify the pixel data of the graphic object produce a transparency visual effect.

As stated earlier, the CPU controls which function blocks perform calculations with resect to the type of graphic object or pixel data being modified. Thus, for example, in the case where the graphic object is a vector, the data input through Specular and Diffuse Shading Function Block 540 is passed through without modification to Depth Cue Function block 530 which modifies the vector pixel data to produce a depth cue effect. This data is then input into the Anti-aliase Block 520 where the anti-aliase calculations are performed to produce an anti-aliase effect and finally to the Transparency Function Block 510 which performs the transparency calculations to produce a transparency effect. The modified RGB data of the vector output by Transparency Function Block 510 is input to the frame buffer.

If he graphic object is a curve, the CPU causes the Diffuse and Specular Shading Function Block 540 to output the pixel curve data without modification to the Depth Cue Function Block 530 which outputs the pixel data unmodified to Anti-Aliase Function Block 520 which performs the anti-aliase calculations to provide an anti-aliase effect and outputs the pixel data to Transparency Function Block 510 which performs the transparency calculations to provide a transparency effect and outputs the modified pixel data to the frame buffered.

If the graphic object is a polygon, the pixel data is input to Specular and Diffuse Shading Function Block 540 which generate diffuse and specular shading components of the graphic object pixel data. The output of Specular and Diffuse Shading Function Block 540 is then input to Depth Cue Function Block 530 which modifies the data to give it the depth cue effect and outputs the data to Anti-Aliase Function Block 520 which is instructed by the CPU to pass the data unmodified to Transparency Function Block 510 where the transparency function is accumulated to modify the graphic object pixel data to give it a transparency effect. The modified pixel data out from the Transparency Function block 510 is input to the frame buffered Similarly, with respect to a patch as a graphic object, the patch pixel data is modified in specular and Diffuse Shading Function Block 540 produce graphic object pixel data containing specular and diffuse shading components. This data is then output to Depth Cue Function Block 530 which performs the depth cue calculation to provide a depth cue visual effect and outputs the data to Anti-Aliase Block 520 which is instructed by the CPU to pass the data unmodified to Transparency Function Block 510 which modifies the pixel data to produce a transparency effect and outputs the modified RGB data to the frame buffered.

A more detailed block diagram of the system of the present invention is set forth in FIG. 2b.

Four adaptive forward differencing circuits (AFDU's) 50, 60, 70 and 90 correspond to AFDU's 10 of FIG. 1 and provide pixel shading values corresponding to the pixel addresses outputted from AFDU's 14. The AFDU's are third order digital differential analyzers which implement an adaptive forward difference solution to a parametric cubic function of parameter t, as described in co-pending applications Ser. Nos. 07/047,696 and 07/047,693 so that as t varies from 0 to 1 along a cubic curve, the at step size for t is adaptively adjusted so that the curve steps along in approximately one pixel steps. Arithmetic units ("AU's") 76, 78, 86, 88, 104, 114, 122, 124, 128, 204, 214, 222, 224, 228, 304, 314, 322, 324 and 328 are all identical units, which can be implemented as gate arrays or built out of discrete components such as "TRW" multipliers and ALU's.

For the sake of clarity, the embodiment described herein relates to a pipeline structure in which each computational step is assigned to a dedicated ALU. It is to be appreciated that the same results may be achieved by the use of recursive processing wherein a single ALU for each channel performs each of the computational operations hereinafter described during successive operational cycles. Feedback and multiplexing circuitry is required to support such recursive processing. An example of such a recursive embodiment will later be described with reference to FIG. 4.

Each of the AU's receives inputs A, B and ALPHA and provides a result designated RES. Each of the AU's can be set by CPU to compute one of the following expressions at the RES output:

| | |
|---|---|
| (ALPHA) $A$ + (1 − ALPHA) $B$ | (6a) |
| (ALPHA) $B$ + (1 − ALPHA) $A$ | (6b) |
| (ALPHA) $A$ + $B$ | (7a) |
| (ALPHA) $B$ + $A$ | (7b) |
| $A * B$ | (7c) |
| $A + B$ | (7d) |

Figure 3:
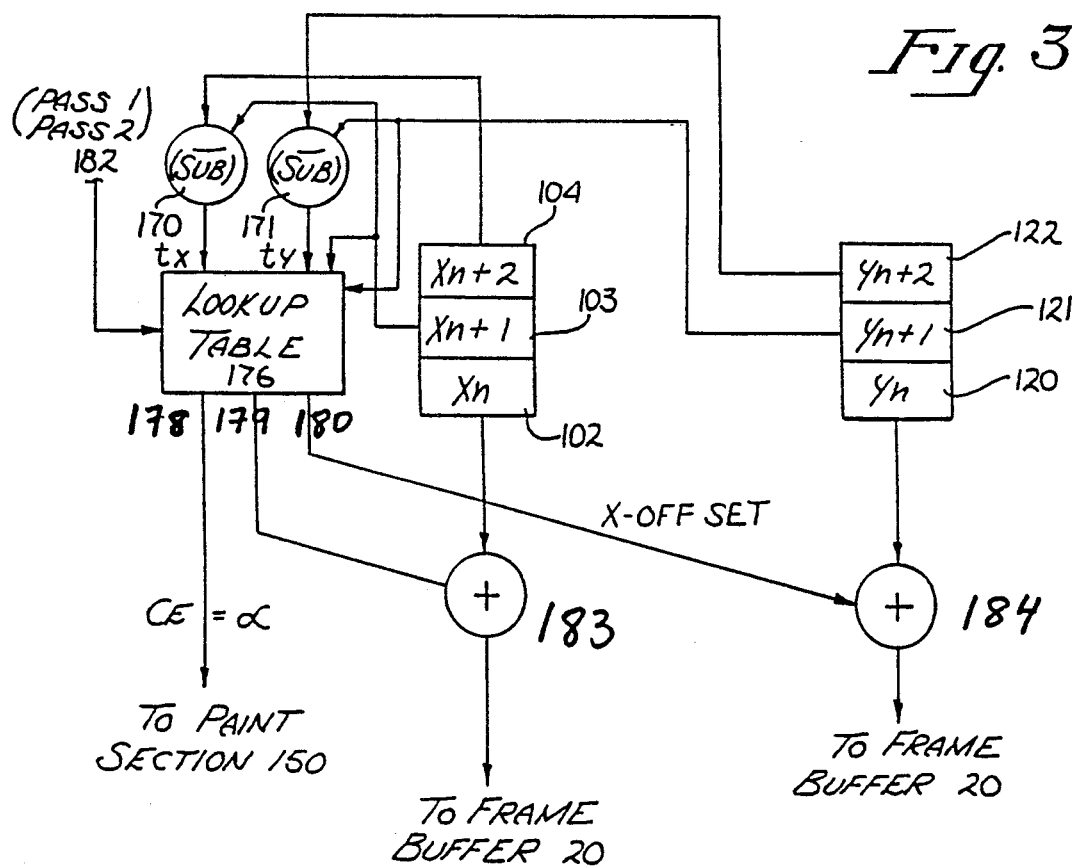
FIG. 3 is another exploded view of some of the circuitry shown in FIG. 2.

The output of AA AFDU 50 is delivered to AA function module 52, which is a look-up table containing a function that converts distance from a scan line to the anti-aliasing weighting factor Be in equation 1. The output of AA function module 52 is inputted to multiplexer 96. Multiplexer 96 also receives as an curve input an anti-alias weighting factor (Ce in equation 2) from a pixel filter circuit 30 (shown in FIG. 3 of geometry section 7. FIG. 3 shows several of the registers (102, 103, 104, 120, 121, 122) shown in FIG. 7 (the afore-referenced pixel filter 30) of co-pending applications, Ser. nos. 07/047,696 and 07/047,693. Subtractor 170 of FIG. 3 receives inputs from x registers 103 and 104 and produces the output $t_x = X_{n+1} - X_{n+2}$ (tx is the x component of the instantaneous tangent vector). Subtractor 171 takes inputs from y registers 121 and 122 to produce the output $t_y = y_{n+1} - y_{n+2}$ (ty is the y component of the instantaneous tangent vector). Lookup table 176 of FIG. 3 takes the instantaneous tangent vector $<t_x, t_y>$ inputs from subtractors 170 and 171, and input 182 from CPU 9, as well as the fractional portional of address $x_{n+1}$ and $y_{n+1}$ from registers 103 and 121.

Lookup table 176 produces three outputs: output 178, the anti-aliasing weighting factor $\alpha$, to the paint section 150, output 179 (the x-offset) to adder 183 and output 180 (the y-offset) to adder 184 which is later received by the frame buffer. Lookup table 176 is loaded with pre-computed values corresponding to the two tables below an anti-aliasing curve is rendered in two passes. A one bit wide input signal 182 to table 176 is set to "zero" by CPU 9 to instruct the circuitry of FIG. 1 to render a first pass of an anti-aliased curve. One bit wide signal is set to "one" to render a second pass. For the first pass, the pixel $<x,y>$ generated by the AFDU's is shaded with the shading factor $1 - |\alpha|$ where $\alpha = \alpha_x$ if the current instantaneous tangent vector $(t_x, t_y)$ is x-major, and $\alpha = \alpha_y$ if y major. The anti-aliasing weighting factor is computed by $$\alpha_x = (f_y - 0.5) + \frac{t_y}{t_x}(f_x - 0.5) \text{ or}$$

$$\alpha_y = (f_x - 0.5) + \frac{t_x}{t_y}(f_y - 0.5)$$

The output of look-up table 176 for the first pass for x major and y major tangent vector is shown below in Table I.

| | Pass 1 | | |
|---|---|---|---|
| major axis | | xoffset | yoffset | weighting factor $\alpha$ |
| $|t_x| \geq |t_y|$ | $\alpha_x > 0$ | 0 | 0 | $1 - |\alpha_x|$ |
| | $\alpha_x < 0$ | | | $1 - |\alpha_x|$ |
| $|t_x| < |t_y|$ | $\alpha_y > 0$ | 0 | 0 | $1 - |\alpha_y|$ |

-continued

| | Pass 1 | | |
|---|---|---|---|
| major axis | xoffset | yoffset | weighting factor $\alpha$ |
| $\alpha_y < 0$ | 0 | 0 | $1 - |\alpha_y|$ |

For the second pass, the pixel having the coordinates <x+offset, y+yoffset> is shaded with $|\alpha|$ where xoffset=sign ($\alpha$)·x major and yoffset=sign ($\alpha$)·y major. The output of look-up table 176 for the second pass for x major and y major tangent vector is shown below in Table II.

| | | Pass 2 | | |
|---|---|---|---|---|
| major axis | | xoffset | yoffset | weighting factor $\alpha$ |
| $|t_x| \geq |t_y|$ | $\alpha_x > 0$ | 0 | 1 | $|\alpha_x|$ |
| | $\alpha_x < 0$ | 0 | $-1$ | $|\alpha_x|$ |
| $|t_x| < |t_y|$ | $\alpha_y > 0$ | 1 | 0 | $|\alpha_y|$ |
| | $\alpha_y < 0$ | $-1$ | 0 | $|\alpha_y|$ |

As shown in Tables I and II, when the signal 182 to look-up table 176 is set to "zero" both outputs 179 and 180 of look-up table 176 are 0. When signal 182 is set to one, output 179 from look-up table 176 is as follows: (i) 0 if input 174 indicates the curve being rendered currently has an x-major tangent vector; (ii) 1 if input 174 indicates y-major tangent vector and $\alpha$ is positive; (iii) $-1$ if input 174 indicates y-major tangent vector and $\alpha$ is negative. Output 180 from table 176 is as follows: (i) 0 if input 174 indicates y-major tangent vector; (ii) 1 if input 174 indicates x-major tangent vector and $\alpha$ is positive; (iii) $-1$ if input 174 indicates x-major tangent vector and $\alpha$ is negative. Adder 183 adds the x-offset 179 from table 176 to the register content 102 and output the x coordinate of the current pixel. Adder 184 adds the y-offset 180 from table 176 to the register content 120 and output the y coordinate of the current pixel.

Referring now back to FIG. 2b, the output of multiplexer 96 of FIG. 2b is received by the ALPHA inputs of AU 124, 224 and 324.

The output of N·N AFDU 60 is received by look-up table 62, which performs an approximation of the inverse square root of N·N. The output of look-up table 62 is provided to the ALPHA input of AU's 78 and 88. AU 78 receives its A input from the RES output of AU 76. The output of INTERP AFDU 70 is provided to the ALPHA input of AU 76 and 86. Registers 72 and 74 provide A and B inputs respectively to AU 76. The output of AU 78 is provided to $x^{oe}$ function module 79. The output of $x^{oe}$ function module 79 is delivered to the ALPHA inputs of AU's 114, 214 and 314.

The outputs of registers 82 and 84 provide inputs A and B respectively of AU 86. The RES output of AU 86 is provided to the A input of AU 88. The B input of AU 88 is provided by register 87. The RES output of AU 88 is provided to the ALPHA input of AU's 104, 204 and 304.

The output of pattern AFDU 90 is provided to PATT function module 92. The output of module 92 is a pattern memory address, which is input to pattern memories 102, 202 and 302. The contents of the addressed locations in pattern memories 102, 202, and 302, are delivered to the A inputs of AU's 104, 204 and 304 respectively. The RES output of AU's 104, 204 and 304 are delivered to multiplexors 110, 210 and 310 respectively. Multiplexors 110, 210 and 310 also receive as inputs the outputs of registers 106, 206 and 306, respectively. Outputs of multiplexors 110, 210 and 310 are delivered at the A inputs of AU's 114, 214 and 314, respectively.

The RES outputs of AU's 114, 214 and 314 are delivered to the A inputs of AU's 122, 222 and 322 respectively. These same RES outputs are provided as sequential inputs to pixel buffer memories 116 and 118, 216 and 218, and 316 and 318, respectively. Sequential outputs of these pixel buffer memories are provided to multiplexors 112, 212 and 312, respectively, which also receive as inputs the outputs of registers 108, 208 and 308, respectively. The outputs of multiplexors 112, 212 and 312 are delivered to the B inputs of AU's 114, 214 and 314, respectively. Employing the circuitry of the present invention as shown in FIG. 2b, a new shading function of the same curve can be calculated and combined in the AU's arithmetically with the shading value of the corresponding pixel previously calculated and stored in the pixel buffer array. The pixel buffers are sequentially controlled by a counter (not shown) which must be reset at the beginning of a curve operation by CPU 9. All registers can be accessed by CPU 9.

AU's 122, 222 and 322 receive B inputs from the outputs of registers 120, 220 and 320, respectively. The RES outputs of AU's 122, 222, and 322 are delivered at the A inputs of AU's 124, 224 and 324, respectively. Red, green and blue feedback data from frame buffer 20 (not shown) is delivered as inputs to sequentially addressed pixel buffer memories 126, 130, 226, 230, 326 and 330. The outputs of pixel buffers 126, 226 and 326 are delivered to the B inputs of AU's 124, 224 and 324 respectively. The outputs of pixel buffers 130, 230 and 330 are delivered to the B inputs of AU's 128, 228 and 328, respectively. The RES outputs of AU's 124, 224 and 324 are delivered at the A inputs of AU's 128, 228 and 328, respectively. The ALPHA input of AU's 128, 228 and 328 is provided by the output of transparency register 98. The RES outputs of AU's 128, 228 and 328 provide digital representations of the pixel shading for the red, green and blue CRT channels, respectively.

Having thus described the interconnections of the circuit components shown in FIG. 2b, the functional performance of the circuitry will now be described with regard to the afore-described shading equations which are implemented by the circuitry of FIG. 2b. In the following discussion, reference will generally be made only to the red channel. However, it is to be understood, unless otherwise indicated, that identical processing occurs in the green and blue channels as well.

1. VECTOR AND CURVE SHADING

As stated, vector and curve shading is accomplished by implementing the equation (8) as listed below:

$$\text{pixel color} = T_c(B_4) + (1 - _c)(Be(PB_3) + (1 - Be)(z(C_d) + (1 - z)(PM))) \quad (8)$$

Where:
$T_c$ = transparency factor
$PB_3$, $PB_4$ = pixel buffer data feedback from frame buffer
$Be$ = modified Bresenham error function
$Z$ = depth weight
$C_d$ = haze or depth cue color
$PM$ = intrinsic curve color from the pattern memories of FIG. 2.

Pattern AFDU 90 outputs the current value of a parametric function to pattern address translation function 92, which, in turn, performs a pattern address translation of the value inputted thereto. The pattern address outputted by address translation function 92 is supplied to pattern memory 102 to address a memory location therein. The addressed contents of the pattern memory 90 represent intrinsic curve color, (and also include a write enable bit for the current pixel of the vector or curve being rendered) designated PM in the above equation (8). In this case, PM passes unaltered through AU's 104 and 114, and is applied to input A of AU 122. Haze color, $C_d$, of equation (8) above is provided by register 120 to input B of AU 122. A z coordinate value from the geometric section 7 is input to z function module 94. Module 94 performs a look-up table function to provide an interpolation weight at the ALPHA input of AU 122 as a function of the z coordinate value. AU 122 performs equation 6(b) above with:

input ALPHA of AU 122 being equal to z.
input A, of AU of 122 being equal to PM.
input B of AU 122 being equal to Cd.

Output RES of AU 122 is therefore expressed as equation (9) below:

$$z(C_d)+(1-z)(PM) \qquad (9)$$

This quantity represents the intrinsic color adjusted for depth (i.e. blended with a density of haze color that is dependent upon the z coordinate value), also referred to as the depth cued color. This value is then provided at input A of AU 124.

AA AFDU 50, in conjunction with AA function module 52, develops the aforementioned modified Bresenham error function, Be. This function is provided by multiplexer 96 to the ALPHA input of AU 124. Pixel data feedback from the frame buffer 20 of FIG. 1 is held by pixel buffer memory 126 and provided to the B input of AU 124. AU 124 performs equation (6b) above with:

input ALPHA of AU 124 being equal to Be;
input A of AU 124 receives the above described depth cued color result which is outputted at output RES of AU 122;
input B of AU 124 being equal to $PB_3$ of equation (1) above.

Output RES of AU 124 is therefore:

$$Be(PB_3)+(1-Be) \text{ (depth cued color)} \qquad (10)$$

This quantity is referred to as the anti-aliased color and is provided to input A of AU 128. Transparency factor, Tc, is provided by transparency register 98 to the ALPHA input of AU 128. Pixel data feedback is held in pixel buffer memory 130 and provided t input of AU 128. AU 128 also performs equation 6(b) above with:

input ALPHA of AU 128 being equal to $T_c$
input A being equal to anti-aliased color
input B of AU 128 being equal to PB4

Output RES of AU 128 is therefore expressed as equation 11 below.

$$T_c(PB_4)+(1-T_c) \text{ (anti-aliased color)} \qquad (11)$$

Referring to the above equations (9) and (10) and the circuitry of FIG. 2b, it can be seen that quantity (11), which is the pixel color as defined by equation (8), is uniquely rendered by the circuitry of the present invention.

2. POLYGON AND PATCH SHADING

Applying the well known Phong approximation, the color at any point on the surface of a polygon illuminated by a single light source at infinity is represented by the sum of a diffuse coefficient times the object color and a specular coefficient raised to an object specular exponent times the light color. [Note: Phong approximations are well known in the art and are fully described, for example, in Tom Duff, *Smoothly Shaded Renderings of Polyhedral Objects on Raster Displays*, Computer Graphics, Volume 13, No. 2, Aug. 1979.]As discussed, the specular and diffuse coefficients are computed for a polygon scan line according to equations (12) and (13) as listed below:

$$\text{diffuse} = K_a + 1/\sqrt{N \cdot N} \; [\alpha NL_{RT} + (1 - \alpha) NL_{LT}] \qquad (12)$$

$$\text{specular} = 1/\sqrt{N \cdot N} \; [\alpha NH_{RT} + (1 - \alpha) NH_{LT}] \qquad (13)$$

Where:
N is the surface normal vector;
L is a unit vector toward the light source;
H is a unit vector in the direction of maximum highlight (i.e. the vector in the direction halfway between the viewer and the light source);
$K_a$ is the coefficient of ambient reflection;
$\alpha$ is an interpolation coefficient, the value of which linearly varies between 0 to 1 along a scan line segment of a polygon being rendered;
RT and LT refer to the value of the dot product N·L at the right and left ends respectively of a scan line segment of a polygon.

The CPU 9 scan converts the polygon and provides a scanline segment across the polygon being rendered. Diffuse and specular coefficients at each end of the scanline are computed, namely $NL_{RT}$, $NL_{LT}$, $NH_{RT}$ and $NH_{LT}$. These coefficients are loaded into registers 82, 84, 72 and 74, respectively. N·N AFDU 60 generates a quadratic function for N·N, (i.e. the dot product of the normal vector along the scanline, which product is well known in the art, see Tom Duff, "Smoothly Shaded Renderings of Polyhedral Objects on Raster Displays," *Computer Graphics*, Volume 13, 1979).

Interp AFDU 70 generates a linear interpolation of x from 0 to 1 along the scanline segment of the polygon being rendered. This factor is applied at the ALPHA inputs of AU's 76 and 86. Implementing equation (6a) above in AU's 76 and 86 provides the following results:

$$RES \; AU \; 76 = (ALPHA)NH_{RT}+(1-ALPHA) NH_{LT} \qquad (14)$$

$$RES \; AU \; 86 = (ALPHA)NL_{RT}+(1-ALPHA) NL_{LT} \qquad (15)$$

Equations 14 and 15 above represent smooth linear interpolations of N·H and N·L respectively. These values are unnormalized in that they no longer represent unit vectors due to the linear interpolation process. Renormalization at each pixel is accomplished by the quadratic function for N·N performed in the N·N AFDU 60.

The quadratic function for N·N is generated in the N·N AFDU 60 and input to look-up table 62 which provides an approximation of the inverse square root. The output of look-up table 62 is provided to the ALPHA inputs of AU's 78 and 88. AU's 78 and 88 perform equation (7a) above. Since the B input of AU 78 is open, the RES output provides (ALPHA) A, which is equal to $$1/\sqrt{N \cdot N} \text{ [RES AU76]}$$

the specular coefficient of equation (13) above. This output is next passed to the $x^{oe}$ function generator 79, where the specular exponent (the specular power) is raised to a power.

The coefficient of ambient reflection Ka, is contained in register 87 and provided at the B input of AU 88. Therefore, the RES output of AU 88 is equal to the diffuse coefficient of equation (12) above.

Pattern AFDU 90 and pattern address translation function 92 generate a pattern memory address. As previously described with respect to the shading of vectors, the pattern memory 102 provides the object color at each pixel. The object color (the red component thereof) is provided to the A input of AU 104. AU 104 performs equation (7a) above, and, since the B input is open, the RES output represents the product of the diffuse coefficient (ALPHA input) and object color (A input). This signal is selected by multiplexer 110 for input to the A input of AU 114. Light color in register 108 is selected by multiplexer 112 for input to the B input of AU 114. The specular coefficient raised to the object specular exponent from function module 79 is applied to the ALPHA input of AU 114. AU 114 performs equation (7b) above, thereby providing a complete pixel color expression at the RES output. Processing downstream of AU 114 has already been discussed with respect to curve and vector shading.

As mentioned earlier, the foregoing discussion has been with regard to Duff's approximation of Phong shading, as described in Tom Duff, "Smoothly Shaded Renderings of Polyhedral Objects on Raster Displays," *Computer Graphics*, Volume 13, 1979. The same circuitry may also implement Gouraud shading. Gouraud shading is commonly used because of its simplicity of computation and speed. It is particularly useful for rough shading. Gouraud shading is implemented as a simple linear interpolation of the color from one point to another across the polygon scanline. Thus, diffuse and specular coefficients are not computed and the color at intermediate pixels along the scan line is given by:

$$\alpha(\text{right color}) + (1 - \alpha)(\text{left color}).$$

Gouraud shading is unnormalized, therefore, it is not necessary to introduce the inverse square root of N·N at AU's 78 and 88. Instead, the ALPHA inputs of AU 78 and 88 are held at unit value. Register 74 is loaded with 0, register 72 is loaded with 1 so that the linear interpolation factor from interp AFDU 70 is passed through unmodified to the A input of AU 78. AU 78 performs equation (7d) above, thus passing the A input unmodified through to RES, and thence bypassing the $x^{Oe}$ function and to the ALPHA input of AU 114. A right object color value is loaded into register 108 and a left object color value is loaded into register 106. The interpolation coefficients are provided by INTERP AFDU 70 at the ALPHA input of AU 114. Multiplexer 110 selects register 106 and multiplexer 112 selects register 108. AU 114 performs equation (6a) above, thereby providing the Gouraud shading at RES output which passes to the A input of AU 122.

Processing of patches within the shading circuitry is similar to polygons except that the shading parameters N·L and N·H are approximated with bi-cubic functions provided by AFDU's 60 and 70 rather than by a linear interpolation across the scan line. [In Michael Shantz and Sheue-Ling Lien, "Shading Bi-cubic Patches," *Computer Graphics*, Volume 21, number 4, 1987 (unpublished), several mathematical techniques for deriving the above-mentioned approximating bi-cubic functions are set forth.] For patch shading, N·N AFDU 60 generates an approximation of the specular coefficient and INTERP AFDU 70 generates an approximation of the diffuse coefficient. The outputs of N·N AFDU 60 and Interp AFDU 70 are applied to the ALPHA inputs of AU's 78 and 86 respectively, the specular coefficient passing through look-up table 62 without alteration.

The A input of AU 78 is held at unit value, thereby passing the specular coefficient on to the RES output unaltered. Similarly, the diffuse coefficient is passed through AU's 86 and 88 without alteration. Thereafter, processing proceeds in the same manner as described above with regard to polygons.

Patch and polygon shading proceed from the RES output of AU 114 in the manner as described above for curve and vector shading with respect to depth cueing and transparency. Intermediate results pass unchanged through AU 124 since anti-aliasing is not performed for patches to polygons.

Figure 4:
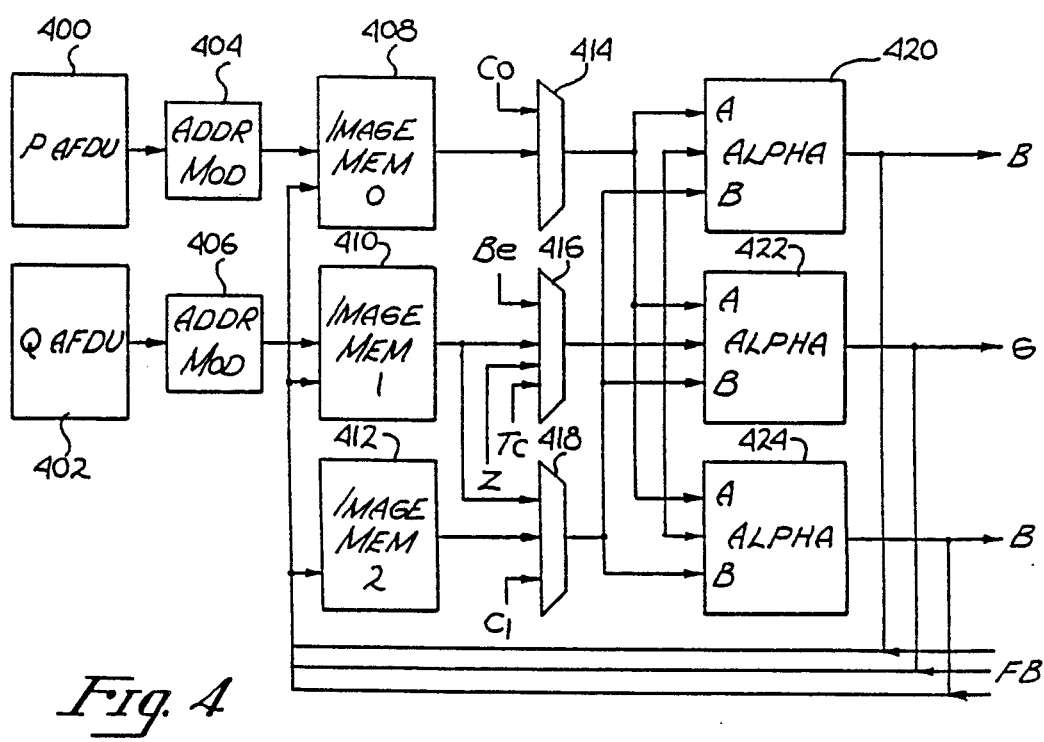
FIG. 4 is an alternative embodiment of the circuitry of FIG. 2.

In FIG. 4 there is shown an alternative embodiment of the circuitry shown in FIG. 2b. Going from right to left in describing the circuitry of FIG. 4, PFDU 400 corresponds to Pattern AFDU 90 and N·N AFDU 60 of FIG. 2b and performs the same function as previously described with respect to these components. Similarly, QAFDU 402 replaces and performs the same functions as AAFDU 50 and INTERP AFDU 70 of FIG. 2b. Address mods 402 and 406 replace and perform the same functions as pattern translation 92. Image mems 0, 1 and 2 correspond to and perform the same functions as address pattern memories 102, 202 and 302, as well as 1/square root function 62 and the pixel buffer memories (i.e. 116, 118, 216, etc.). Multiplexer 414 selects as an input a desired color constant co which may be NL$_{lt}$, Ca, Cd or Oc in the above equations, or the output of image memory 0. Multiplexer 416 selects as an input BE (the modified Bresenham error factor) or the output of image memory 1 or z, or tc, depending upon the particular function being rendered. Multiplexer 418 selects the output of image memory 1, or the output of image memory 2, or Cl, a desired color constant which may be NL$_{lt}$, Ca, Cd, Oc or other constant color volume. The selected output of multiplexors 414, 416 and 418 are fed to AU's 420, 422 and 424, which, respectively, replace all red, green and blue AU's of FIG. 2b, as well as AU's 76, 78, 86 and 88 of FIG. 2b. CPU 9 controls the circuitry of FIG. 4, such that each component performs an appropriate function in order to execute the aforedescribed functions, the implementation of which has been fully described with respect to FIG. 2.

It will be appreciated that the above-described invention may be embodied in other specific forms without departing from the spirit or essential characteristics thereof. In particular, the AFDU's can easily be extended to implement higher order functions than cubics. The present embodiments are, therefore, to be considered in all aspects as illustrative and not restrictive, the scope of the invention being indicated by the appended claims rather than by the foregoing description, and all changes which come within the meaning and range of equivalency are, therefore, intended to be embraced therein.

We claim:

1. An apparatus for generating shading values of graphic objects for display at a predetermined location on a graphics display device, said graphic objects comprising vectors, curves, polygons and patches, each graphic object defined by graphic object pixel data initially comprising a representation of the color of the graphic object, said graphic object shaded according to a light source, said device comprising a central processing unit (CPU), memory, a frame buffer and a display device which displays the pixel data stored in the frame buffer, said apparatus comprising:

means for modifying the graphic object pixel data according to specular and diffuse functions to include specular and diffuse shading values for the graphic object, said specular function determined from specular shading scan line values, an object specular exponent for the graphic object and a surface normal vector for the graphic object, said specular shading scan line values being determined according to the dot product of the surface normal vector and unit vector in the direction of maximum highlight, said diffuse function determined from diffuse shading scan line values, a coefficient of ambient reflection of the graphic object, the surface normal vector for the graphic object, a pattern memory relevant to the graphic object, said diffuse shading scan line values being determined according to the dot product of the surface normal vector and a unit vector in the direction of the light source;

means or modifying the graphic object pixel data to produce a depth cue effect according to a depth cue function, said depth cue function determined for a depth cue color for the graphic object, said background color and the graphic object pixel data;

means for modifying the graphic object pixel data to produce an anti-aliase effect according to an anti-aliase function, said anti-aliase function determined from a modified Bresenham error function, and the pixel data read from the frame buffer located at the predetermined location the graphic object is to be displayed;

means for modifying he graphic object pixel data to produce a transparency effect according to a transparency function, said transparency function determined from a transparency coefficient for the graphic object, pixel data read from the frame buffer located at the predetermined location the graphic object is to be displayed and the graphic object pixel data;

means for organizing the means for modifying the graphic object pixel data according to specular and diffuse functions, means for modifying ht graphic object pixel data to produce an anti-aliase effect, means for modifying the graphic object pixel data to produce a depth cue effect and means for modifying the graphic object pixel data to produce a transparency effect in a pipeline structure, said pipeline structure comprising means which serially connect said means for modifying the graphic object pixel data according to specular and diffuse functions, means for modifying the graphic object pixel data to produce an anti-aliase effect, means for modifying the graphic object pixel data to produce a depth cue effect and means for modifying the graphic object pixel data to produce a transparency effect such that the output of one means is connected to the input of another means, the first means connected in the pipeline structure having unmodified graphic object pixel data as one of its input and the last means connected in the pipeline being input to he frame buffer and having as its output the modified pixel data a reflective of a shaded image of the graphic object;

means for the CPU to selectively enable said means for modifying the graphic object pixel data according to specular and diffuse functions, means for modifying the graphic object pixel data to produce an anti-aliase effect, means for modifying the graphic object pixel data to produce a depth cue effect and means for modifying the graphic object pixel data to produce a transparency effect according to the type of graphic object the graphic object pixel data defines; and means for the frame buffered to receive the output of the last means connected in the pipeline structure and the frame buffered for subsequent display of the shaded image of the graphic object.

2. The apparatus according to claim 1 wherien said graphic object ids a vector and said means for modifying the graphic object pixel data to produce a depth cue effect, means for modifying he graphic object pixel data to produce an anti-aliase effect and means or modifying the graphic object pixel data to produce a transparency effect are enable to produce the shaded image of the vector.

3. The apparatus according to claim 1 wherien said graphic object is a curve and said means for modifying the graphic object pixel data to produce a depth cue effect, means for modifying the graphic object pixel data to produce an anti-aliase effect and means for modifying the graphic object pixel data to produce transparency effect are enabled to produce the shaded image of the curve.

4. The apparatus according to claim 1 wherien said graphic object is a polygon and said means for modifying the graphic object pixel data to include specular and diffuse shading values, means for modifying the graphic object pixel data to produce a depth cue effect and means or modifying the graphic object pixel data to produce transparency effect are enable to produce the shaded image of the polygon.

5. The apparatus according to claim 1 wherein said graphic object is a patch and said means for modifying the grapic object pixel data to include specular and diffuse shading values, means for modifying the graphic object pixel data to produce a depth cue effect and means for modifying the graphic object pixel data to produce transparency effect a re enabled to produce the shaded image of the patch.

6. The apparatus according to claim 1 wherein said diffuse function is computed according to the equation:

$$\left(\frac{\alpha NL_{rt} + (1-\alpha)NL_{lt}}{\sqrt{N \cdot N}} + Ka\right)PM$$

where $\alpha$ is an interpolation coefficient value which linearly increases from zero to one, $NL_{lt}$, $NL_{rt}$ are the diffused shading scan line values of the left and right sides of the scan line comprising the dot produce of the surface normal vector for the graphic object (N) and the unit vector towards the light source (L), N is the surface normal vector for the graphic object, Ka is coefficient of ambient reflection and PM is pattern memory relevant to he graphic object.

7. The apparatus according to claim 1 wherien said specular function comprises the equation:

$$\left[\left(\frac{\alpha NH_{rt} + (1-\alpha)NH_{lt}}{\sqrt{N \cdot N}}\right)^{Oe}\right]LC$$

where $\alpha$ is a value which linearly increases from zero to one, $NH_{lt}$, $NH_{rt}$ are the specular shading scan line values of the left and right hand side of a scan line comprising the dot product of the surface normal vector for the graphic object (N) and the unit vector in the direction of maximum highlight, N is the surface normal vector for the graphic object, LC is the light color of a light source for the graphic object and Oe is the object specular exponent for the graphic object.

8. The apparatus according to claim 1 wherein said depth cue function comprises the equation:

$$\alpha B + (1-\alpha)a,$$

where $\alpha$ is the depth cue color for the graphic object, B is the background color and A is the orphic object pixel data.

9. The apparatus according to claim 1 wherien said anti-aliase function is computed according to the following equation:

$$\alpha B + (1-\alpha)a$$

where $\alpha$ is the modified Bresenham error function B is the pixel data from the frame buffer and A is the graphic object pixel data.

10. The apparatus according to claim 1 wherein said transparency function is computed according to the following equation:

$$\alpha B + (1-\alpha)a$$

where $\alpha$ is the transparency coefficient, B is pixel data from the frame buffer and A is the graphic object pixel data.

11. The apparatus according to claim 1 wherien said means for modifying the pixel data to include the specular and diffuse shading values-comprises:
means for calculating the diffuse shading function according the following equation:

$$\left(\frac{\alpha NL_{rt} + (1-\alpha)NL_{lt}}{\sqrt{N \cdot N}} + Ka\right)PM$$

where $\alpha$ is an interpolation coefficient value which linearly increases from zero to one, $NL_{lt}$, $NL_{rt}$ are the diffused shading coefficients of the left and right sides of ht scan line comprising the dot product of the surface normal vector for the graphic object (N) and the unit vector towards the light source (L), N is the surface normal vector for the graphic object, Ka is coefficient of ambient reflection and PM are the portions of the pattern memory relevant to the graphic object;
means for computing a part of the specular shading function according to the following equation:

$$\left(\frac{\alpha NH_{rt} + (1-\alpha)NH_{lt}}{\sqrt{N \cdot N}}\right)^{Oe}$$

where $\alpha$ is the interpolation coefficient value which linearly increases from zero to one, $NH_{lt}$, $NH_{rt}$ are the specular shading coefficients of the left and right hand side of a scan line comprising the dot product of the surface normal vector for the graphic object (N) and the unit vector towards the light source (L), N is the surface normal vector for the graphic object and Oe is the specular power value; and
means or combining he outputs of the means for computing the diffuse shading function and a part of the specular shading function according to the following equation:

$$ab + A,$$

where $\alpha$ is the output generated by the means for computing a part of the specular function, B is the light color (LC() of the light source and A is the output generated by the means for computing the diffuse shading function:

12. A method for generating shading values of graphic objects for display at predetermined locations on a graphics display, said graphic objects comprising vectors, curves, polygons and patches, each graphic object defined by graphic object pixel data initially comprising a representation of the color of the graphic object, each graphic object shaded according to a light source, said device comprising a central processing unit (CPU), memory, a frame buffer and a display which displays the data stored in the frame buffer, said method comprising the steps of:
selectively computing specular and diffuse shading values for the graphic object according to specular and diffuse shading functions and combining said specular and diffuse shading values for the graphic object width the graphic object pixel data to modify graphic object pixel data to include the specular and diffuse shading values,
said specular function determined from specular shading scanline values, an object specular exponent for the graphic object, a light color with respect to the graphic object and a surface normal vector for the graphic object, said specular shading scan line values being determined according to the dot product of the surface normal vector and unit vector in the direction of maximum highlight,
said diffuse function determined from diffuse shading scan line values, a coefficient of ambient reflection for the graphic object, the surface normal vector for the graphic object, a pattern memory relevant to the graphic object, said diffuse shading scan line values being determined according to the dot product of the surface normal vector and a unit vector toward the light source;

selectively modifying the graphic object pixel data to produce a depth cue effect according to a a depth cue function, said depth cue function determined from a depth cue color for the graphic object, the background color and the graphic object pixel data;

selectively modifying the graphic object pixel data to produce an anti-aliase effect according to an anti-aliase functions is anti-aliase function determined from a modified Bresenham error function, the graphic object pixel data and the pixel data from the frame buffer located at the predetermined location the graphic object is to be displayed;

selectively modifying the graphic object pixel data to produce a transparency effect according to a transparency function, said transparency function determined from a transparency coefficient for the graphic object, pixel data brad from the frame buffer located at the predetermined location the graphic object is to be displayed and the graphic object pixel data;

selecting the functions to modify the graphic object pixel data according to the type of graphic object to genrate a shaded image of the graphic object; and outputting the modified graphic object pixie data to the frame buffer for display of the shaded image.

13. The method according to claim 12 wherein said graphic object is a vector and the steps of modifying the graphic object pixel data to produce a depth cue effect, modifying the graphic object pixel data to produce an anti-aliase effect and modifying the graphic object pixel data to produce a transparency effect are selected to produce the shaded image of the vector.

14. The method according to claim 12 wherein said graphic object is a curve and the steps of modifying the graphic object pixel data to produce a depth cue effect, modifying the graphic object pixel data to produce an anti-aliase effect and modifying the graphic object pixel data to produce a transparency effect are selected to produce the shaded image of the curve.

15. The method according to claim 12 wherein said graphic object is a polygon and the step of modifying the graphic object pixel data to include specular and diffuse shading values, modifying the graphic object pixel data to produce a depth cue effect and modifying the graphic object pixel data to produce a transparency effect are selected to produce the shaded image of the polygon.

16. The method according to claim 12 wherein said graphic object is a patch and the steps of modifying the graphic object pixel data to include specular and diffuse shading values, modifying the graphic object pixel data to produce a depth cue effect and modifying the graphic object pixel data to produce transparency effect are selected to produce the shaded image of the patch.

17. The method according to claim 12 wherein said diffuse function is computed according to the equation:

$$\left( \frac{\alpha NL_{rt} + (1-\alpha)NL_{lt}}{\sqrt{N \cdot N}} + Ka \right) PM$$

where $\alpha$ is an interpolation coefficient value which linearly increases from zero to one, $NL_{lt}$, $NL_{rt}$ are the diffused shading scan line values of the left and right dices of the scan line comprising the do product of the surface normal vector for ht graphic object (N) and the unit vector towards the light source (L), N is the surface ce normal vector for the graphic object, Ka is coefficient of ambient reflection and PM is pattern memory relevant to the graphic object.

18. The method according to claim 12 wherien said specular function is computed according to the following equation:

$$\left[ \left( \frac{\alpha NH_{rt} + (1-\alpha)NH_{lt}}{\sqrt{N \cdot N}} \right)^{Oe} \right] LC$$

where $\alpha$ is a value which linearly increase form zero to one, $NH_{lt}$, $NH_{rt}$ are the specular shading scanline values of the left and right hand side of a scan line comprising the dot produce of the surface normal vector for the graphic object (N) and the unit vector in the direction maximum highlight, N is the surface normal vector for the graphic object, LC is the light color of the light source and Oe is the object specular exponent.

19. The method according to claim 12 wherein said depth cue function is computed accord ingot the equation:

$$\alpha B + (1-\alpha)A$$

where $\alpha$ is the depth cue color for the graphic object, B is the background color and A is the graphic object pixel data.

20. The method according to claim 12 wherein said anti-aliase function is computed according to the equation:

$$\alpha B + (1-\alpha)a$$

where $\alpha$ is the modified Bresenham error function, B is the pixel data from the frame buffer and A is the graphic object pixel data.

21. The method according to claim 12 wherein said transparency function is computed according to the following equation:

$$\alpha B + (1-\alpha)A$$

where $\alpha$ is the transparency coefficient, B is pixel data from the frame buffer and A is the graphic object pixel data.

22. The method according to claim 12 wherien said step of modifying the pixel data to include the specular and diffuse shading values comprise:

calculating the diffuse shading function according to the following equation:

$$\left( \frac{\alpha NL_{rt} + (1-\alpha)NL_{lt}}{\sqrt{N \cdot N}} + Ka \right) PM$$

where α is an interpolation coefficient value which linearly increases from zero to one, $NL_{lt}$, $NL_{rt}$ are the diffused shading coefficients of the left and right sides of ht scan line comprising the do product of the surface normal vector for the graphic object (N) and the unit vector towards the light source (L), N is the surface normal vector for the graphic object, Ka is coefficient of ambient reflection and PM are ht portions of the pattern memory elevated of the graphic object;

computing a part of the specular shading function according to the following equation:

$$\left( \frac{\alpha NH_{rt} + (1 - \alpha)NH_{lt}}{\sqrt{N \cdot N}} \right)^{Oe}$$

where α is the interpolation coefficient value which linearly increases from zero to one, $NH_{lt}$, $NH_{rt}$ are the specular shading coefficients of the let and right hand side of a scan line comprising the dot product of the surface normal vector for the graphic object (N) and the unit vector towards the light source (L). N is the surface normal vector for the graphic object and Oe is the specular power value; and combining the outputs of the means for computing the diffuse shading functional a part of the specular shading function according the following equation:

$$\alpha B + A,$$

where α is the output generated by the computing a part of the specular function, B is the light color (LC) of the light source and A is the output generated by the computing the diffuse shading function.

* * * * *

UNITED STATES PATENT AND TRADEMARK OFFICE
CERTIFICATE OF CORRECTION

PATENT NO. : 5,063,375

DATED : November 5, 1991

INVENTOR(S) : Lien et al.

It is certified that error appears in the above-identified patent and that said Letters Patent is hereby corrected as shown below:

In column 3 at line 17, please delete " Tc[B " and insert -- Tc [PB] --.

In column 3 at line 28, please delete " , ".

In column 3 at line 28, please delete " ) " and iinsert -- ( --.

In column 3 at line 39, please delete " N " and insert -- N · N --.

In column 4 at line 15, please delete " function " and insert -- function comprising: --.

In column 5 at line 67, please delete " an " and insert -- and --.

In column 7 at line 50, please delete " greater " and insert -- greater detail --.

In column 10 at line 18, please delete " forwar " and insert -- forward --.

In column 10 at line 42, please delete " the " and insert -- jth --.

In column 10 at line 42, please delete " Ax " and insert -- Axj --.

In column 11 at line 22, please delete " 2i b " and insert -- 2b --.

UNITED STATES PATENT AND TRADEMARK OFFICE
CERTIFICATE OF CORRECTION

PATENT NO. : 5,063,375

DATED : November 5, 1991

INVENTOR(S) : Lien et al.

It is certified that error appears in the above-identified patent and that said Letters Patent is hereby corrected as shown below:

In column 12 at line 19, please delete "$\alpha$is " and insert -- $\alpha$ is --.

In column 12 at line 66, please delete " 70 " and insert -- 79 --.

In column 13 at line 59, please delete " $\alpha$equals " and insert -- $\alpha$ equals --.

In column 14 at line 8, please delete " RGHB " and insert -- RGB --.

In column 14 at line 16, please delete " $\alpha$is " and insert -- $\alpha$ is --.

In column 14 at line 32, please delete " 5410 " and insert -- 510 --.

In column 14 at line 34, please delete " read " and insert -- red --.

In column 14 at line 36, please delete " fame buffered " and insert -- frame buffer --.

In column 14 at line 40, please delete " orphic " and insert -- graphic --.

In column 14 at line 54, please delete " 3230 " and insert -- 230 --.

In column 15 at line 14-15, please delete " buffered " and insert -- buffer.--.

In column 15 at line 18, please delete " generate " and insert -- generates --.

UNITED STATES PATENT AND TRADEMARK OFFICE
CERTIFICATE OF CORRECTION

PATENT NO. : 5,063,375

DATED : November 5, 1991

INVENTOR(S) : Lien et al.

It is certified that error appears in the above-identified patent and that said Letters Patent is hereby corrected as shown below:

In column 15 at line 29, please delete " buffered " and insert -- buffer.--.

In column 15 at line 31, please delete " specular " and insert -- Specular --.

In column 15 at line 41, please delete " buffered " and insert -- buffer. --.

In column 15 at line 53, please delete " at " and insert -- dt--.

In column 17 at line 8, please delete " offset " and insert -- $x_{offset}$ --.

In column 18 at line 56, please delete " (1-c) " and insert -- (1-Tc) --.

In column 18 at line 56, please delete " $B_4$ " and insert -- $PB_4$ --.

In column 19 at line 53, plesae delete " t " and insert -- to --.

In column 22 at line 12, please insert a space between " ] " and " For ".

In column 23, claim 1 at line 39, please delete " or " and insert -- for --.

In column 23, claim 1 at line 42, please delete " said " and insert -- the --.

In column 23, claim 1 at line 52, please delete " he " and insert -- the --.

In column 23, claim 1 at line 62, please delete " ht " and insert -- the --.

In column 24, claim 1 at line 14, please delete " he " and insert -- the --.

UNITED STATES PATENT AND TRADEMARK OFFICE
CERTIFICATE OF CORRECTION

PATENT NO. : 5,063,375

DATED : November 5, 1991

INVENTOR(S) : Lien et al.

It is certified that error appears in the above-identified patent and that said Letters Patent is hereby corrected as shown below:

In column 24, claim 1 at line 28, please delete " buffered " and insert -- buffer --.

In column 24, claim 2 at line 33, please delete " ids " and insert -- is --.

In column 24, claim 2 at line 35, plese delete " he " and insert -- the --.

In column 24, claim 2 at line 38, please delete " enable " and insert -- enabled --.

In column 24, claim 4 at line 56, please delete " enable " and insert -- enabled --.

In column 24, claim 5 at line 64, please delete " a re " and insert -- are --.

In column 25, claim 6 at line 15, please delete " he " and insert -- the --.

In column 25, claim 8 at line 35, please delete " $\alpha$ " and insert -- A --.

In column 25, claim 8 at line 37, please delete " orphic " and insert -- graphic --.

In column 25, claim 9 at line 43 and claim 10 at line 51, please delete " $\alpha$ " and insert -- A --.

In column 26, claim 11 at line 1, please delete " ht " and insert -- the --.

UNITED STATES PATENT AND TRADEMARK OFFICE
CERTIFICATE OF CORRECTION

PATENT NO. : 5,063,375

DATED : November 5, 1991

INVENTOR(S) : Lien et al.

It is certified that error appears in the above-identified patent and that said Letters Patent is hereby corrected as shown below:

In column 26, claim 11 at line 25, please delete " he " and insert -- the --.

In column 26, claim 11 at line 25, please delete " or " and insert -- for --.

In column 26, claim 11 at line 33, please delete " (LC() " and insert -- " (LC) " --.

In column 26, claim 12 at line 51, please delete " width " and insert -- with --.

In column 27, claim 12 at line 13, please delete " functions is anti-aliase function" and insert -- function, said anti-aliase function --.

In column 27, claim 12 at line 23, please delete " brad " and insert -- read --.

In column 27, claim 12 at line 30, please delete " genrate " and insert -- generate --.

In column 27, claim 15 at line 50, please delete " step " and insert -- steps --.

In column 28, claim 17 at line 10, please delete " dices " and insert -- sides --.

In column 28, claim 17 at line 10, please delete " do" and insert -- dot --.

In column 28, claim 17 at line 11, please delete " ht " and insert -- the --.

In column 28, claim 17 at line 14, please delete " is " and insert -- is the --.

In column 28, claim 18 at line 25, please delete " form " and insert -- from --.

In column 28, claim 19 at line 34, please delete " accord ingot " and insert -- according to --.

UNITED STATES PATENT AND TRADEMARK OFFICE
CERTIFICATE OF CORRECTION

PATENT NO. : 5,063,375
DATED : November 5, 1991
INVENTOR(S) : Lien et al.

It is certified that error appears in the above-indentified patent and that said Letters Patent is hereby corrected as shown below:

In column 28, claim 20 at line 46, please delete " $\alpha$ " and insert -- A --.

In column 29, claim 22 at line 4, please delete " ht " and insert -- the --.

In column 29, claim 22 at line 4, please delete " do " and insert -- dot --.

In column 29, claim 22 at line 9, please delete " are ht " and insert -- are the --.

In column 29, claim 22 at line 10, please delete " elevated of " and insert -- relevant to --.

In column 30, claim 22 at line 3, please delete " let " and insert -- left --.

In column 30, claim 22 at line 10, please delete " functional a part " and insert -- function and a part--.

In column 30, claim 22 at line 11, please delete " according " and insert -- according to --.

Signed and Sealed this

Eleventh Day of November, 1997

Attest:

BRUCE LEHMAN

Attesting Officer

Commissioner of Patents and Trademarks